United States Patent [19]
Hart

[11] 3,845,381
[45] Oct. 29, 1974

[54] HIGH-RESOLUTION MAGNETIC ANOMALY DETECTOR FOR WELL BORE PIPING

[75] Inventor: Herbert J. Hart, Houston, Tex.

[73] Assignee: Schlumberger Technology Corporation, New York, N.Y.

[22] Filed: Apr. 12, 1973

[21] Appl. No.: 350,551

[52] U.S. Cl. ............................ 324/34 R, 324/37
[51] Int. Cl. .................................... G01r 33/12
[58] Field of Search ........................ 324/34 R, 37

[56] References Cited
UNITED STATES PATENTS

| | | | |
|---|---|---|---|
| 2,558,427 | 6/1951 | Fagan | 324/34 R |
| 2,866,155 | 12/1958 | Martin | 324/37 |
| 3,114,876 | 12/1963 | Schuster | 324/34 R |
| 3,267,366 | 8/1966 | Bricand | 324/34 R |

Primary Examiner—Robert J. Corcoran
Attorney, Agent, or Firm—Ernest R. Archambeau, Jr.; William R. Sherman; Stewart F. Moore

[57] ABSTRACT

This invention involves new and unique apparatus for detecting magnetic anomalies in the metallic casing which lines a wellbore. More particularly, the apparatus is suitable for detecting the joint between two sections of "flush-joint" casing. As described herein, the new and improved magnetic detector comprises a pair of permanent magnets for generating magnetic flux fields in the metal casing. A center core member located between the permanent magnet is shaped such that the flux generated by each permanent magnet travels along two paths from the detector to the casing. A pair of series-opposed windings are wound at longitudinally spaced intervals around the core member such that a change in the proportion of flux travelling along each path will be detected by the windings. A pair of magnetic flux focusing rings are interposed in one of the two paths of each flux field for concentrating the flux in that path thereby providing a detector having improved resolution.

13 Claims, 6 Drawing Figures

PATENTED OCT 29 1974  3,845,381
SHEET 1 OF 2

HIGH-RESOLUTION MAGNETIC ANOMALY DETECTOR FOR WELL BORE PIPING

BACKGROUND OF THE INVENTION

I. Field of the Invention

This invention relates to apparatus for detecting magnetic anomalies in a well pipe such as the casing lining a wellbore. Such magnetic anomalies include those anomalies occurring at the joint between adjacent casing sections. More particularly, the apparatus of this invention is suitable for detecting joints between sections of so-called "flush joint"casing.

II. Description of the Prior Art

Various types of devices for detecting joints and collars between sections of casing lining a borehole and other anomalies in the casing having been heretofore proposed. Typical of these are the devices described in U.S. Pat. No. 2,459,499, granted to Castel, U.S. Pat. No. 2,558,427, granted to Fagan, U.S. Pat. No. 3,114,876, granted to Schuster, and U.S. Pat. No. 3,267,365, granted to Baker. These devices include a detecting instrument which is adapted to be moved through the borehole by means of a cable suspended from the surface of the earth. The detecting instrument is constructed so that an electrical signal is generated each time that the instrument passes anomalies, such as a joint in the casing. These signals are transmitted by way of insulated conductors contained in the cable to suitable indicating or recording apparatus located at the surface of the earth. Indications obtained in this manner are useful in controlling the depth at which other operations are carried out in the borehole. In particular, they are useful for positioning various tools and instruments at desired depths in the borehole and for correlating the depths at which measurements are obtained with different tools that are used in the borehole at different times.

However, because of the very minor magnetic anomalies that occur at the juncture of two sections of "flush-joint" casing, the above-mentioned detecting devices lack the necessary magnetic resolution and have been found less than satisfactory for detecting such joints.

SUMMARY

Accordingly, it is an object of the present invention to provide highly sensitive detection apparatus for detecting minor anomalies in wellbore casing, including the joints of "flush-joint" casings.

This and other objects of the present invention are obtained by providing a non-magnetic support member adapted for movement through the wellbore casing. A magnet with a pole piece including a plurality of pole faces and a plurality of coil windings are mounted within the support member. The pole piece is formed to direct magnetic flux from all of the pole faces in substantially parallel directions. To concentrate magnetic flux radiating from a pole face, a focusing ring is mounted on the support structure between the pole face and the wellbore casing. Each coil encircles a portion of the pole piece between adjacent pole faces and adjacent coil winding are connected in opposed relation so that for a given direction of flux through the coils, any change in such flux will generate opposite polarity voltage signals in the adjacent coil windings. The resulting voltage generated by the coils is transmitted to the surface where it is exhibited.

DESCRIPTION OF THE INVENTION

Figure 1:
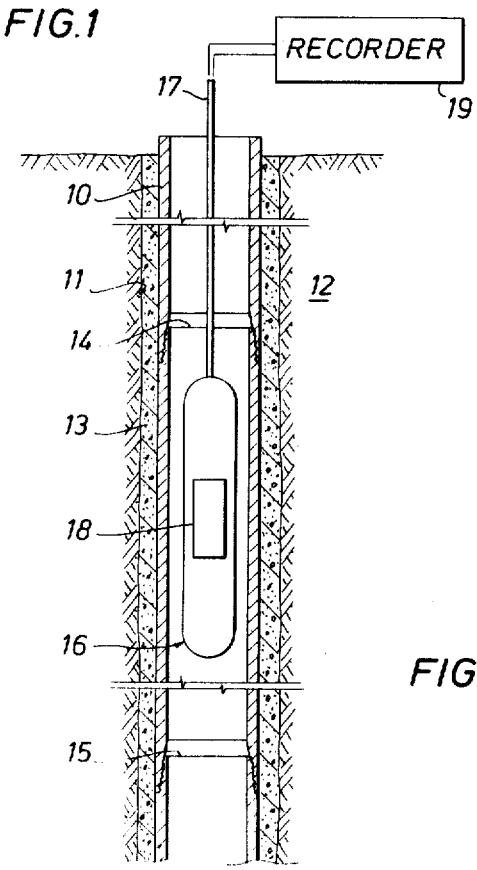
FIG. 1 shows wellbore apparatus including a magnetic anomaly detecting devices constructed in accordance with the present invention.

Referring to FIG. 1 of the drawings, there is shown apparatus for detecting minor magnetic anomalies in a tubular structure such as casing 10 lining a wellbore 11 drilled into subsurface earth formations 12. The casing 10 is usually made of iron or steel. The annular space between the outside of the casing 10 and the earth formations 12 is filled with a layer of cement 13. Casing 10 is made in sections and typical joints between sections are indicated at 14 and 15. These casing joints 14 and 15 are of the "flush-joint" type. The apparatus shown in FIG. 1 further includes an elongated support member 16 adapted for longitudinal movement through the interior of the casing 10. Support member 16 is suspended from the surface of the earth by means of an armored multiconductor cable 17, and is raised and lowered in the wellbore by a suitable winch (not shown). Signals from the magnetic detector 18 supported by support member 16 are sent through cable 17 to the surface of the earth where they may be exhibited by a suitable indicating device such as recorder 19.

Figure 2A:
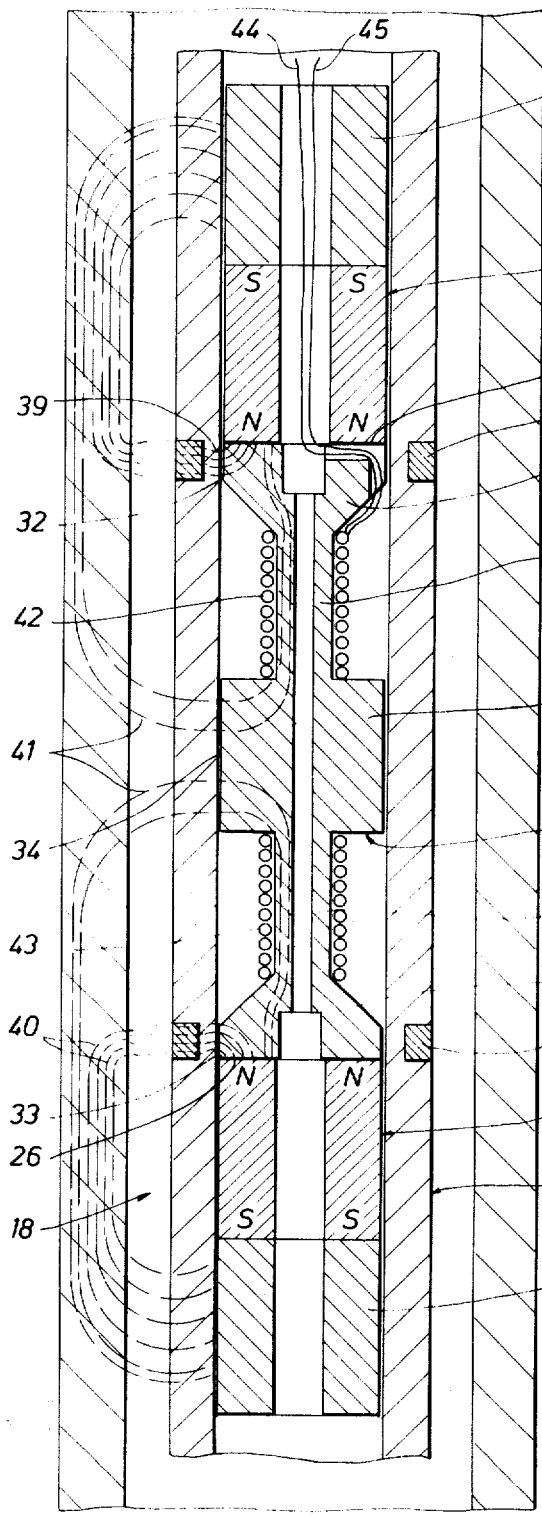
FIG. 2A is an enlarged cross-sectional view of a first embodiment of the magnetic anomaly detecting device and the adjoining wellbore casing of FIG. 1.

In the typical embodiment of the invention shown in FIG. 2A, the magnetic detection apparatus 18 comprises a pair of cylindrical permanent magnets 20 and 21 in coaxial alignment and affixed to opposite annular end portions 22 and 23 of an elongated cylindrical common central pole piece 24 made of a highly permeable ferro-magnetic material, such as iron. Each of the magnets 20 and 21 are oriented such that like poles 25 and 26 of the magnets are adjacent annular end portions 22 and 23 respectively of pole piece 24. In addition, two cylindrical highly permeable ferro-magnetic pole pieces 27 and 28 are positioned at the outer end of each of the magnets 20 and 21. The entire magnetic detector 18 is enclosed in a suitable housing 29 made of a non-magnetic metal such as K-Model, a nickel alloy, or some other mechanically strong material such as laminated plastic or Bakelite. Pole piece 24 comprises a longitudinally center member 30 extending between magnets 20 and 21, which joins the two annular end portions 22 and 23 with a third annular portion 31 centrally located with respect to end portions 22 and 23. Each of the three spaced annular portions 22, 23 and 31 include a peripheral pole face 32, 33 and 34, respectively.

Figure 2B:
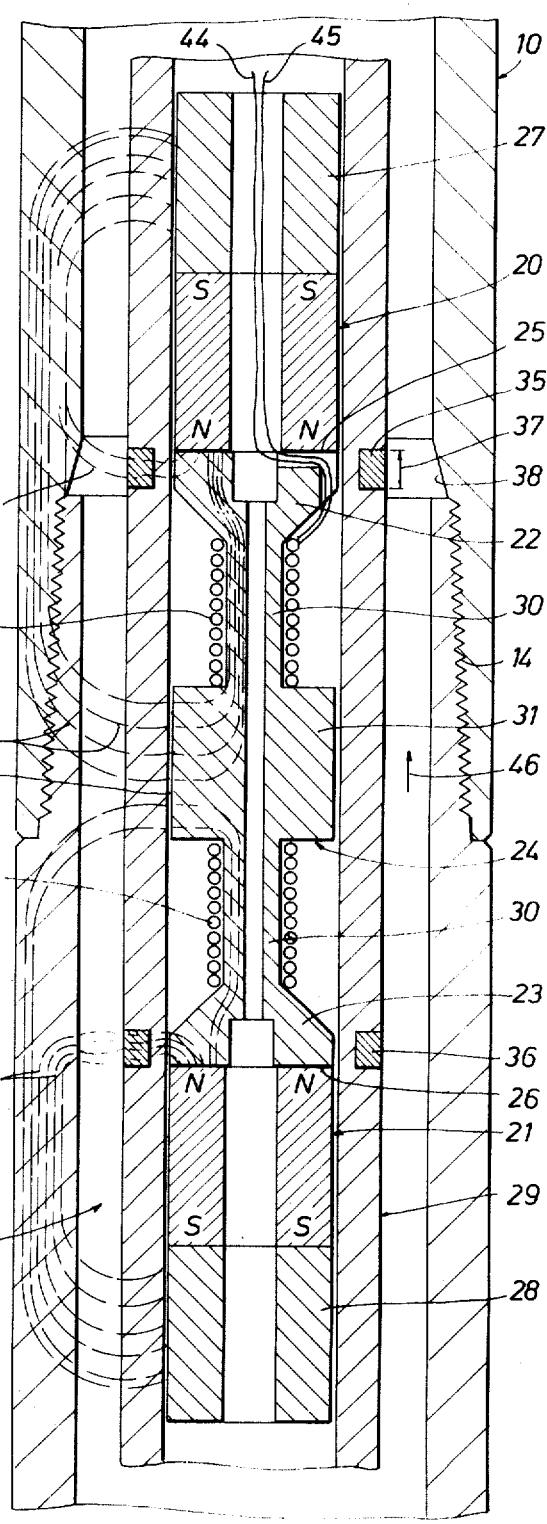
FIG. 2B shows the device of FIG. 2A in position at a level of a "flush joint" in the casing.

In order to more effectively detect minor anomalies such as those occurring at the juncture of two sections of "flush-joint" casing by relative motion of the magnetic detector 18 as described hereinafter, of particular significance in the present invention are the two coaxial magnetic flux focusing rings 35 and 36 mounted in housing 29 adjacent annular end portions 22 and 23, respectively. As is shown in FIG. 2B (to be further discussed hereinafter, and which is identical to FIG. 2A except detector 18 has been moved upward in the wellbore until focusing ring 35 is opposite "flush-joint" gap 38) with respect to focusing ring 35, each of the focusing rings 35 and 36 preferably have a dimension 37 which is no larger than the characteristic size of the gap 38 at a "flush joint" of the casing 10. It will also be appreciated by those skilled in the art for purposes of minimizing noise, there exists an optimum gap between the pole piece and an adjacent focusing ring. That is, there is an optimum difference between the outside diameter of end portions 32 and 33 and center pole piece 31 and the inside diameter of the focusing rings 35 and 36. This optimum gap may, of course, be determined by known flux field mapping techniques. Focusing rings 35 and 36 are made of a highly permeable magnetic material and effectively concentrate the magnetic flux leaving peripheral pole faces 32 and 33, respectively prior to this flux entering metal casing 10. The focusing effect or concentration by focusing ring 35 on the magnetic flux leaving peripheral pole face 32 and represented by flux lines 39 is clearly shown in FIG. 2A. As will be explained further, hereinafter, by concentrating the magnetic flux in this manner, the effect of minor or very small magnetic anomalies in the metal casing on the flow path of the magentic flux can be significantly increased.

As illustrated in FIG. 2A, the magnetic circuit for each of the magnets 20 and 21 is completed through a portion of the adjacent casing 10 so that magnetic anomalies in the vicinity of detector 18 affect the proportion of magnetic flux from each magnet which is carried through the central member 30 and the central annular portion 31. Thus, one path of the magnetic circuit for the magnet 20, for example, leads through the end annular portion 22, the pole face 32 and focusing ring 35 to the casing 10 while another path follows the central member 30 to central annular portion 31 to the casing, both paths being completed through the casing and pole piece 27 to the opposite end of the magnet. Accordingly, the character of the part of the casing 10 adjacent pole faces 32 and 33 determines the proportion of the flux from magnet 20 which passes through the central annular portion 31 and out pole face 34 of pole piece 31.

Furthermore, because of the like polarity of the poles 25 and 26 adjacent pole piece 24 and because of the relatively low internal reluctance of the material forming the pole piece 24, pole piece 24 is maintained at nearly a constant magnetic potential. Consequently, the lines of magnetic flux 39, 40 and 41 extend in substantially parallel directions from pole faces 32, 33 and 34 as indicated in the drawing; however in reality some flux leakage occurs along the length of central member 30. This leakage, of course, is balanced and therefore any resulting effect in the coils tends to be of self-cancelling.

Between end annular portion 22 and central annular portion 31 of pole piece 24, a coil winding 42 encircles the longitudinal center member 30 thus enclosing magnetic flux from magnet 20 which passes out through pole face 34. Similarly, another coil winding 43 encircles member 30 between annular portions 23 and 31 thereby responding to changes in flux from magnet 21 passing out through annular portion 23, and central annular portion 31.

Figure 3:
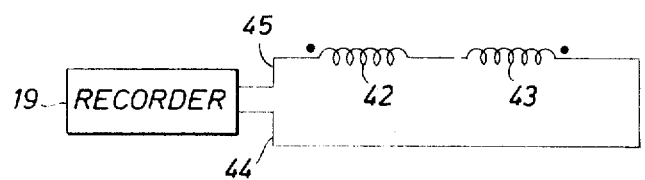
FIG. 3 is a typical circuit schematic of the wellbore apparatus of FIG. 1 and the detecting device of FIG. 2A or 2B.

As illustrated in the circuit diagram of FIG. 3, the windings 42 and 43 are connected in series in opposed relationship so that for a given direction of flux through both coil windings, the corresponding voltage signals generated by a change in the flux will be equal and of opposite polarity and therefore self-cancelling. This opposed relation may be obtained by winding the two coils 42 and 43 around center member 30 in opposite directions and then connecting the two coils. The electrical circuit is completed through two conductors 44 and 45 which lead to a signal exhibiting device at the earth's surface such as recorder 19.

When the detector assembly 18 is located in a uniform portion of the wellbore casing 10, that is, a portion in which no casing joint is present as shown in FIG. 2A, the flow paths of the magnetic flux generated by permanent magnets 20 and 21 are nominally balanced. However, it will be appreciated that if any of the flux lines associated with one of the permanent magnets is diverted so that they leave pole piece 24 at the central annular portion 31 rather than the appropriate end annular portion, then the increased flux passing along longitudinal center member 30 will be detected by the associated winding. For example, if flux from magnet 20 is diverted so that it leaves pole piece 24 at annular portion 31 rather than end annular portion 22, then the increase in flux passing through central member 30 will be detected by winding 42. Similarly, if flux associated with magnet 21 is diverted from pole face 33 to pole face 34 this change will be detected by winding 43.

Referring now to FIG. 2B, as magnetic detecting apparatus 18 is moved longitudinally through the wellbore casing 10, for example, in the upward direction as indicated by arrow 46, a magnetic anomaly such as gap 38 located at casing joint 14 influences the flux passing outwardly from the pole faces 32, 34 and 33 in sequence. Assuming that coil windings 42 are wound with a positive polarity and that flux passing through magnet 20 and center member 30 in a downward direction is of positive polarity, while windings 43 and flux passing in an upward direction are of negative polarity, then a determination may be made of the signals generated in the windings for the different cases where the magnetic anomaly is in front of different ones of pole faces 32, 34 and 33. For example, when casing joint 14 is encountered as the detector assembly is moved upwardly in the wellbore, the air gap adjacent pole face 32 is materially increased due to gap 38, thereby materially increasing the reluctance between pole face 32 and casing 10 so that a substantial portion of the flux from pole 25 of magnet 20 travels downwardly through longitudinal center portion 30 and radiates from pole face 34 rather than pole face 32. The magnetic circuit is then completed by the flux traveling upwardly through the metal casing 10 and then returning to the permanent magnet 20 by way of pole piece 27. Thus, it will be appreciated that the increased flux flowing in longitudinal center portion 30 between pole faces 32 and 34 will induce a voltage in winding 42 which is exhibited by recorder 19 at the surface of the earth. As detector 18 continues to move upward, pole face 32 moves away from gap 38, and the flux lines passing therethrough begin to increase back to their original values. This represents a reversal in the direction of the flux change and therefore the net voltage signal exhibited by recorder 19 is in the form of one positive and one negative peak. It is also of particular importance to note at this point, that because of focusing ring 35, the flux normally radiating from pole face 32 is concentrated such that gap 38 has a significantly increased effect and results in a more abrupt or pronounced diversion of the flux lines from pole face 32 to pole face 34. This more abrupt change in the flux flowing through the detecting windings results in the increased sensitivity of the present invention. It should also be understood at this point that the total voltage signal transmitted to recorder 19 at the earth's surface at any point in time, is the combination voltage generated by winding 42 and winding 43. However, in the present embodiment, it is assumed that the two pole faces 32 and 33 are far enough apart that any effect magnetic anomaly or gap 38 might have on the flux associated with the distant pole is negligible.

Now as central pole portion 31 passes gap 38, it will be appreciated that the small amount of flux normally travelling from permanent magnet 20 to center portion 31 will tend to decrease because of the increased reluctance between pole face 34 and metal casing 10 due to gap 38. Thus, it would appear that this change in flux would be detected by winding 42 and also cause a signal. However, when pole face 34 moves past gap 38, a similar effect will be produced on the flux generated from permanent magnet 21. These two effects are opposite and substantially equal; therefore, the total effect is negligible.

Figure 4:
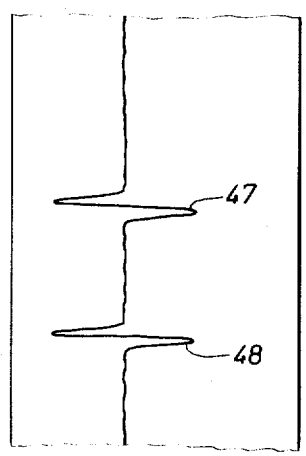
FIG. 4 illustrates idealized records produced by the wellbore apparatus of FIG. 1.

Finally, when the pole face 33 passes gap 38, it can be seen that according to considerations similar to those discussed with respect to pole face 32 passing gap 38, another voltage signal similar to the first signal will be generated and exhibited by recorder 19. As will also be appreciated, because of the arrangement of the permanent magnet and the reverse but equal windings of coil 43 with respect to coil 42, this second signal will have the same polarity and magnitude of the first signal. Thus, FIG. 4 illustrates an actual representation of the signal produced by detector 18 at recorder 19. It should be pointed out at this point that although detector 18 is preferably constructed using a pair of permanent magnets to thereby provide two magnetic circuits as was discussed with respect to FIG. 2A and 2B to produce two signals 47 and 48 as shown in FIG. 4, the present invention also, of course, would operate by using a single permanent magnet to provide only one magnetic circuit and only one corresponding signal.

Figure 5:
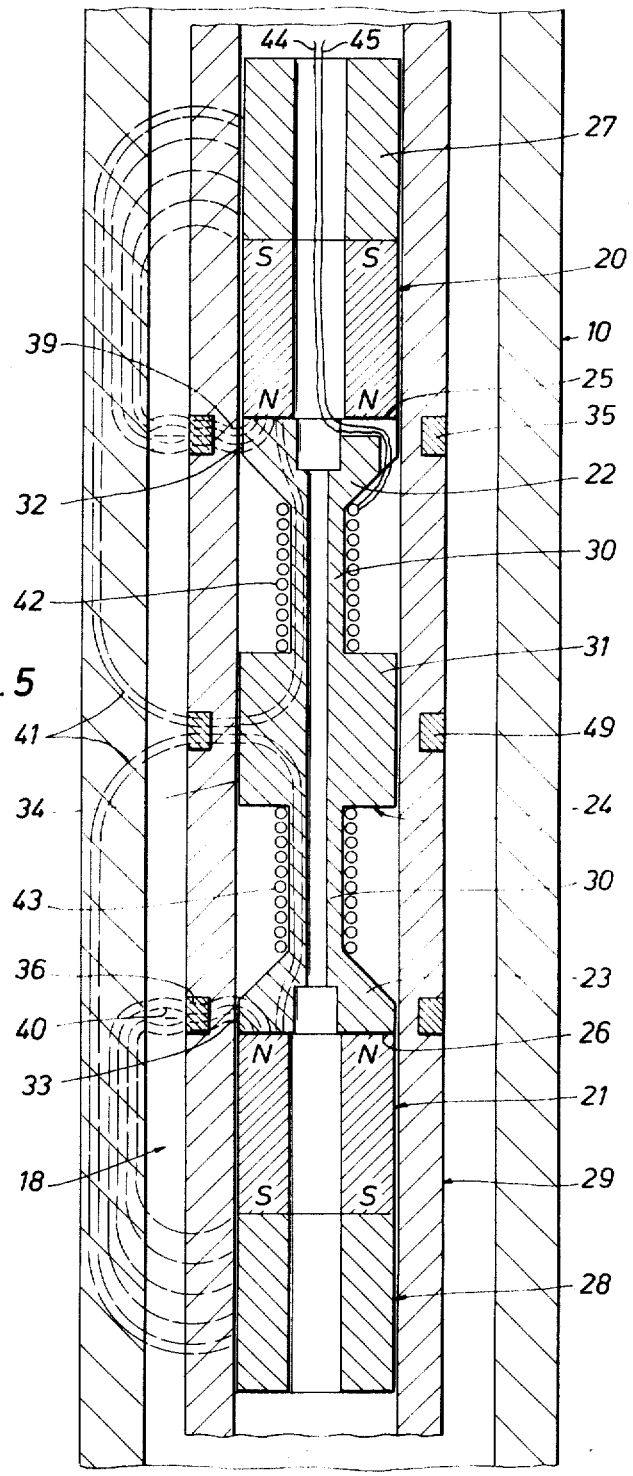
FIG. 5 is an enlarged cross-sectional view of a second embodiment of the magnetic detecting device and the adjoining wellbore casing of FIG. 1.

The manner of the operation of the embodiment shown in FIG. 5 is similar to that discussed above. However, it will be noted that a third focusing ring 49 is included on housing 29 adjacent pole face 34 of central annular pole portion 31. Focusing ring 49 provides concentration of the magnetic flux leaving central pole piece 24 at this point and thereby increases the amplitude of the resulting signal produced by windings 42 and 43.

Therefore, while there have been described what are at present considered to be preferred embodiments of this invention, it will be obvious to those skilled in the art that various changes and modifications may be made therein without departing from the invention, and the invention is, therefore, intended to cover all such changes and modifications as fall within the true spirit and scope of the invention.

I claim:

1. Apparatus adapted for detecting magnetic anomalies in a string of well bore pipe and comprising:
    an elongated support member adapted for movement through a string of such well bore pipe;
    magnet means cooperatively arranged on said support member with the north and south magnet poles of said magnet means being situated at longitudinally spaced intervals along said support member for producing a magnetic flux field;
    first pole-piece means cooperatively arranged on said support member immediately adjacent to one of said magnetic poles;
    second pole-piece means cooperatively arranged on said support member immediately adjacent to the other of said magnetic poles for defining a first shorter flux path extending between said magnetic poles;
    third pole-piece means cooperatively arranged on said support member magnetically coupled to said second pole-piece means and longitudinally separated from said second pole-piece means for defining a second longer flux path extending between said magnetic poles;
    magnetic flux-focusing means cooperatively arranged on said support and disposed exterior of and adjacent to said second pole-piece means for selectively reducing the overall magnetic reluctance of said first flux path below the overall magnetic reluctance of said second flux path only so long as said first flux path is not traversing a magnetic anomaly on an adjacent wall section of a well bore pipe through which said apparatus is being moved; and
    detecting coil means on said support member and cooperatively arranged between said second and third pole-piece means for detecting changes in the flux intensities in said first and second flux paths.

2. The anomaly-detecting apparatus of claim 1 wherein said flux-focusing means include a member of a magnetic material which is laterally spaced from said second pole-piece means.

3. The anomaly detecting apparatus of claim 1 wherein said support member is a hollow body of a non-magnetic material respectively enclosing said magnet means, said first, second and third pole-piece means, and said detecting coil means.

4. The anomaly detecting apparatus of claim 1 wherein said support member is a hollow body of a non-magnetic material respectively enclosing said magnet means, said first, second and third pole-piece means, and said detecting coil means; and said flux-focusing means include a member of a magnetic material which is mounted on said support member around at at least a major portion of said second pole-piece means.

5. The anomaly detecting apparatus of claim 4 wherein said flux-focusing member is laterally spaced from said second pole-piece means.

6. Apparatus adapted for detecting magnetic anomalies in a string of well bore pipe and comprising:

an elongated tubular support of a non-magnetic material adapted for passage through a string of such well bore pipe;

a permanent magnet cooperatively arranged within said tubular support with the north and south magnetic poles of said magnet being spaced along the central axis of said tubular support for producing a magnetic flux field;

a first pole piece cooperatively arranged within said tubular support immediately adjacent to one of said magnetic poles;

a second pole piece cooperatively arranged within said tubular support immediately adjacent to the other of said magnetic poles for defining a first flux path between said magnetic poles to traverse a first adjacent longitudinal wall section of a well bore pipe in which said apparatus is situated;

a third pole piece cooperatively arranged within said tubular support having one portion magnetically coupled to said second pole piece and extending longitudinally therefrom to another portion of said third pole piece for defining a second longer flux path between said magnetic poles to serially traverse the first longitudinal wall section as well as a second adjacent longitudinal wall section of such a well bore pipe;

magnetic flux-focusing means cooperatively disposed on said tubular support around at least a portion of said second pole piece for selectively reducing the overall magnetic reluctance of said first flux path below the overall magnetic reluctance of said second flux path only so long as said first flux path is not traversing a magnetic anomaly of at least a predetermined magnitude in the first pipe wall section; and a detecting coil coaxially wound around said one portion of said third pole piece for detecting changes in the flux intensities in said first and second flux paths which are representative of the presence of such a magnetic anomaly.

7. The anomaly detecting apparatus of claim 6 wherein said flux-focusing means include a ring of a magnetic material which is coaxially mounted on said tubular support.

8. The anomaly detecting apparatus of claim 7 wherein said ring is radially spaced from said second pole piece.

9. Apparatus adapted for detecting magnetic anomalies in a string of tandemly coupled pipe joints in a well bore and comprising:

an elongated tubular support of a non-magnetic material adapted for movement through string of such pipe joints;

first and second permanent magnets cooperatively arranged at longitudinally spaced positions within said tubular support with their magnetic poles being spaced along the central axis of said tubular support and oppositely oriented in relation to one another with opposed like poles longitudinally spaced apart;

first and second pole pieces cooperatively arranged within said tubular support and respectively positioned immediately adjacent to the unopposed poles of said first and second magnets;

third and fourth pole pieces cooperatively arranged within said tubular support and respectively positioned immediately adjacent to said opposed poles of said first and second magnets for defining first and second longitudinally spaced flux paths respectively looping between said magnetic poles of each of said first and second magnets to respectively traverse first and second longitudinally spaced adjacent wall sections of a string of such pipe joints through which said apparatus is then being moved;

a fifth pole piece cooperatively arranged within said tubular support between said third and fourth pole pieces and magnetically coupled thereto and having an intermediate pole portion for defining third and fourth longitudinally spaced longer flux paths respectively looping between said magnetic poles of each of said first and second magnets to respectively serially traverse such first and second wall sections as well as third and fourth longitudinally spaced adjacent wall sections of a string of such pipe joints which lie therebetween;

first and second magnetic flux-focusing means cooperatively disposed on said tubular support and respectively positioned around at least a portion of said third and fourth pole pieces for selectively reducing the combined magnetic reluctances of each of said first and second flux paths respectively below the combined reluctances of each of said third and fourth flux paths, respectively only so long as either of said first and second flux paths is not traversing a junction of adjacent ones of such pipes joints which has a magnetic reluctance of at least a predetermined magnitude; and first and second electrically intercoupled detecting coils positioned between said fifth pole piece and said third and fourth pole pieces respectively and cooperatively arranged for detecting changes in the flux intensities in said flux paths which are representative of the presence of a pipe joint junction in either of such first and second wall sections.

10. The anomaly detecting apparatus of claim 9 further including third flux-focusing means cooperatively disposed on said tubular support and around at least a portion of said fifth pole piece for selectively enhancing the sensitivity of said detecting coils.

11. The anomaly detecting apparatus of claim 9 wherein said first and second flux-focusing means are respectively comprised of first and second rings of magnetic material coaxially mounted on said tubular support.

12. The anomaly detecting apparatus of claim 11 wherein said first and second rings are each spaced radially from said third and fourth pole pieces respectively.

13. The anomaly detecting apparatus of claim 11 further including a third ring of magnetic material coaxially mounted on said tubular support around said fifth pole piece for focusing said third and fourth flux paths to selectively enhance the sensitivity of said detecting coils.

* * * * *